(12) United States Patent
Tseng et al.

(10) Patent No.: US 9,932,150 B2
(45) Date of Patent: Apr. 3, 2018

(54) BAG WITH GRIPPING BANDS

(71) Applicant: Inteplast Group Corporation, Livingston, NJ (US)

(72) Inventors: Ben Tseng, Eastbrunswick, NJ (US); Hou-Cheng Su, Jersey City, NJ (US); Jyh-yao Raphael Li, Parsippany, NJ (US)

(73) Assignee: Inteplast Group Corporation, Livingston, NJ (US)

( * ) Notice: Subject to any disclaimer, the term of this patent is extended or adjusted under 35 U.S.C. 154(b) by 0 days.

(21) Appl. No.: 15/223,763

(22) Filed: Jul. 29, 2016

(65) Prior Publication Data

US 2018/0029754 A1    Feb. 1, 2018

(51) Int. Cl.
| | | |
|---|---|---|
| *B65D 33/16* | (2006.01) | |
| *B65D 33/25* | (2006.01) | |
| *B29C 47/00* | (2006.01) | |
| *B29C 47/08* | (2006.01) | |
| *B29C 47/12* | (2006.01) | |
| *B29L 31/00* | (2006.01) | |

(52) U.S. Cl.
CPC ............ *B65D 33/25* (2013.01); *B29C 47/003* (2013.01); *B29C 47/0864* (2013.01); *B29C 47/12* (2013.01); *B29L 2031/7128* (2013.01)

(58) Field of Classification Search
CPC .................................................... B65D 33/25
USPC ...................................................... 383/63, 65
See application file for complete search history.

(56) References Cited

U.S. PATENT DOCUMENTS

| | | | | |
|---|---|---|---|---|
| 4,479,244 A | * | 10/1984 | Ausnit ............... | B65D 33/2541 |
| | | | | 383/63 |
| 5,369,847 A | * | 12/1994 | Naya .................. | B65D 33/2508 |
| | | | | 24/30.5 R |
| 6,505,383 B2 | * | 1/2003 | Machacek .......... | B65D 33/2591 |
| | | | | 24/30.5 P |
| 8,753,011 B2 | * | 6/2014 | Nanba ................ | B65D 33/2533 |
| | | | | 24/400 |
| D769,117 S | * | 10/2016 | Tseng ............................ | D9/443 |
| 9,624,003 B1 | * | 4/2017 | Tseng ................. | B65D 33/2508 |
| 2005/0196076 A1 | | 9/2005 | Tanaka et al. | |

(Continued)

FOREIGN PATENT DOCUMENTS

| | | | | |
|---|---|---|---|---|
| JP | 2007119043 A | * | 5/2007 | |
| JP | 2008044616 A | * | 2/2008 | |
| JP | 2012218746 A | * | 11/2012 | |

*Primary Examiner* — Jes F Pascua
(74) *Attorney, Agent, or Firm* — Senniger Powers LLP

(57) ABSTRACT

A closure for closing a bag and a die head and method for making the closure. The closure includes two closure members having support walls and mating interlocking profiles. The support walls are resilient and have self-retaining forms in vertical section including middle sections curving outwardly away from one another when mounted on a bag. Top portions of the support walls extend outwardly away from one another to form gripping panels when the closure is closed. A die head for forming a closure member includes a body that defines a slot including a support wall segment for forming the support wall of the closure member. The support wall segment includes first and second portions oriented transverse to one another and intersecting at a vertex. To form the closure member, polymer is extruded through the slot and quenched.

12 Claims, 9 Drawing Sheets

(56) References Cited

U.S. PATENT DOCUMENTS

2011/0044566 A1* 2/2011 Fish .................... B65D 33/007
                                                    383/63
2011/0176751 A1* 7/2011 Anzini ............... B65D 33/2541
                                                    383/63
2014/0270586 A1   9/2014 Petkovsek

* cited by examiner

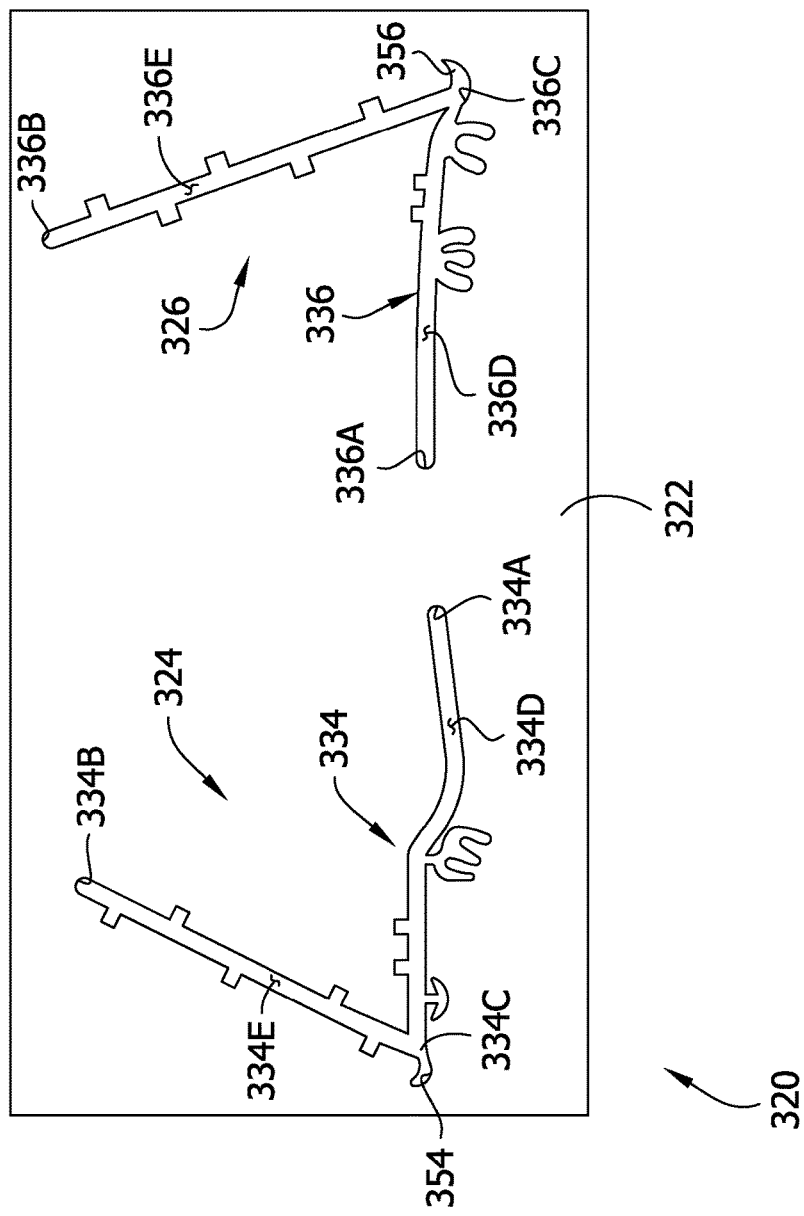

BAG WITH GRIPPING BANDS

FIELD

The present invention generally relates to plastic bags with closures and more specifically to a plastic bag with gripping panels for opening the bag.

BACKGROUND

Plastic bags are used for many different applications, such as shipping, food packaging, biohazard disposal, etc. Certain plastic bags are reclosable. Reclosable bags include a reclosable closing structure that can be used to selectively open and close the bag. It is desirable for the bag to have features for gripping when opening the reclosable closing structure.

SUMMARY

In one aspect, a closure for selectively closing a bag that is configured to facilitate opening of the bag when the bag is closed by the closure comprises first and second closure members configured for mounting on the bag in opposed relation for releasably closing the bag. Each closure member comprises a support wall having a top end and a bottom end spaced apart along a height and a first side and a second side spaced apart along a width. An interlocking profile extends along the width of the respective support wall at a location spaced apart from the top end of the support wall. The interlocking profile is configured for selective complementary interlocking engagement with the interlocking profile of the other closure member to close the closure. Each support wall is resilient and has a self-retaining form in vertical section. The form extends widthwise of the support wall and includes a top portion adjacent the top end, a bottom portion adjacent the bottom end, and a curved middle portion between the top portion and the bottom portion. When the first and second closure members are mounted on the bag, the middle portions of the support walls curve outwardly away from one another as they extend upward toward the top portions of the support walls and the top portions of the support walls extend outwardly away from one another as they extend upward from the middle portions to form gripping panels that are spaced apart from one another when the closure is closed.

In another aspect, a die head for extruding a closure member of a closure for closing a bag that is configured to facilitate opening of the bag when the bag is closed by the closure comprises a die head body for being operatively received in an extruder. The die head body defines an extrusion slot. The extrusion slot includes an interlocking profile segment shaped and arranged for extruding an interlocking profile of the closure member configured for selective interlocking engagement with an interlocking profile of a mating closure member of the closure. A support wall segment is fluidly connected to the interlocking profile segment and shaped and arranged for forming a support wall of the closure member joined to the interlocking profile when the closure member is extruded through the die head. The support wall segment has a first end, an opposite second end, a vertex spaced apart between the first end and the second end, a first portion extending between the vertex and the first end and including a first inner section extending outward from the vertex generally along a first axis, and a second portion extending between the vertex and the second end and including a second inner section extending outward from the vertex generally along a second axis. The first and second axes are oriented transverse to one another and intersect one another at the vertex.

In another aspect, a method of making a closure member of a closure for closing a bag that is configured to facilitate opening of the bag when the bag is closed by the closure comprises extruding polymer through a closure member slot of a die head assembly to form the closure member. The step of extruding comprises forming the polymer in the closure member slot so that a resilient support wall portion of the polymer has a form in section including a first inner segment and a second inner segment oriented transverse to the first inner segment and intersecting the first inner segment at a vertex. The closure member is quenched whereby the first and second inner segments of the polymer are set to form a middle portion of a support wall of the closure member having a self-retaining, resilient cross-sectional profile that is curved so that when the closure member is mounted on the bag, an upper portion of the support wall extends outwardly from the bag to form a gap between the support wall and a support wall of a closure member mounted on the bag in opposing relation to the closure member.

Other objects and features will be in part apparent and in part pointed out hereinafter.

BRIEF DESCRIPTION OF THE DRAWINGS

FIG. 9 is a plan view of a die head for forming a closure of the bag of FIGS. 5-6.

Corresponding reference characters indicate corresponding parts throughout the drawings.

DETAILED DESCRIPTION

Figure 1:
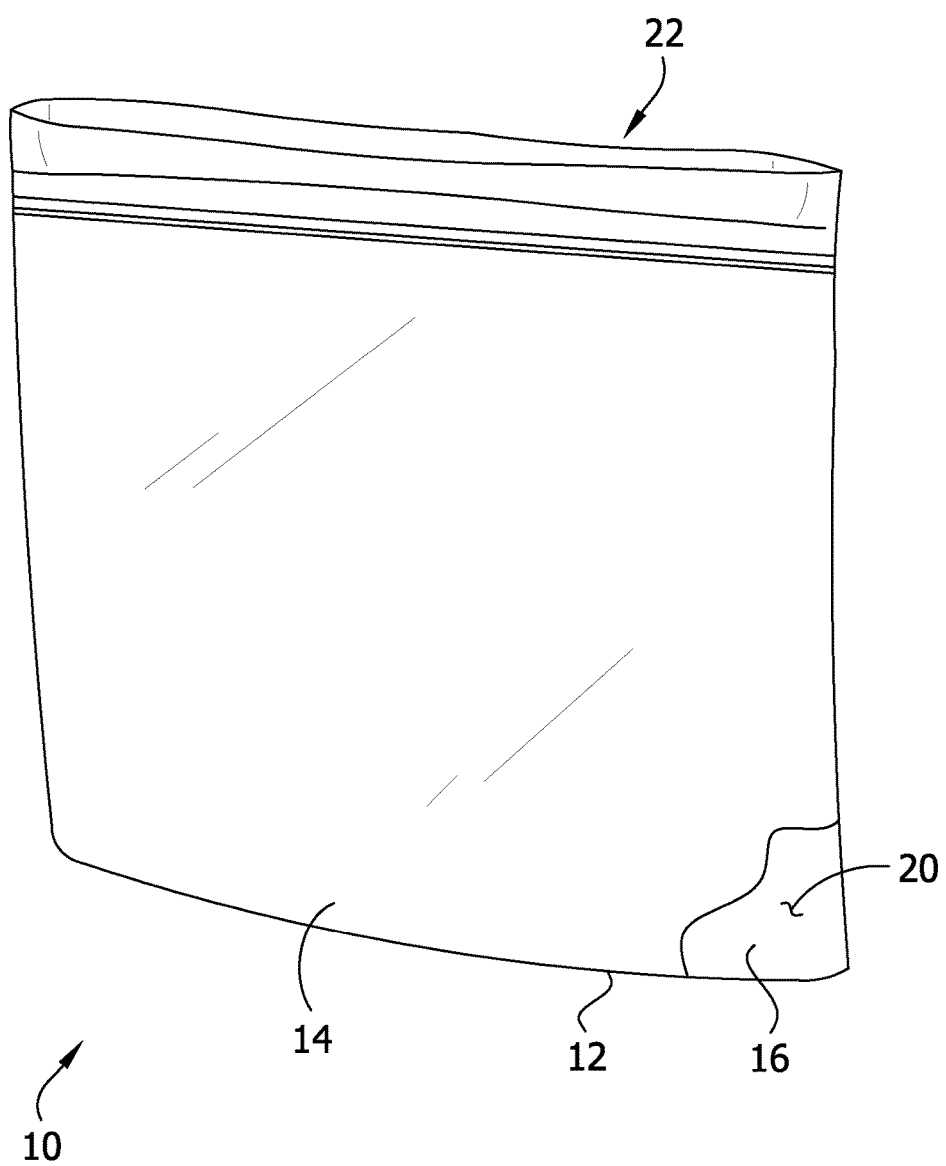
FIG. 1 is a perspective of a closed bag with parts broken away.
Figure 2:
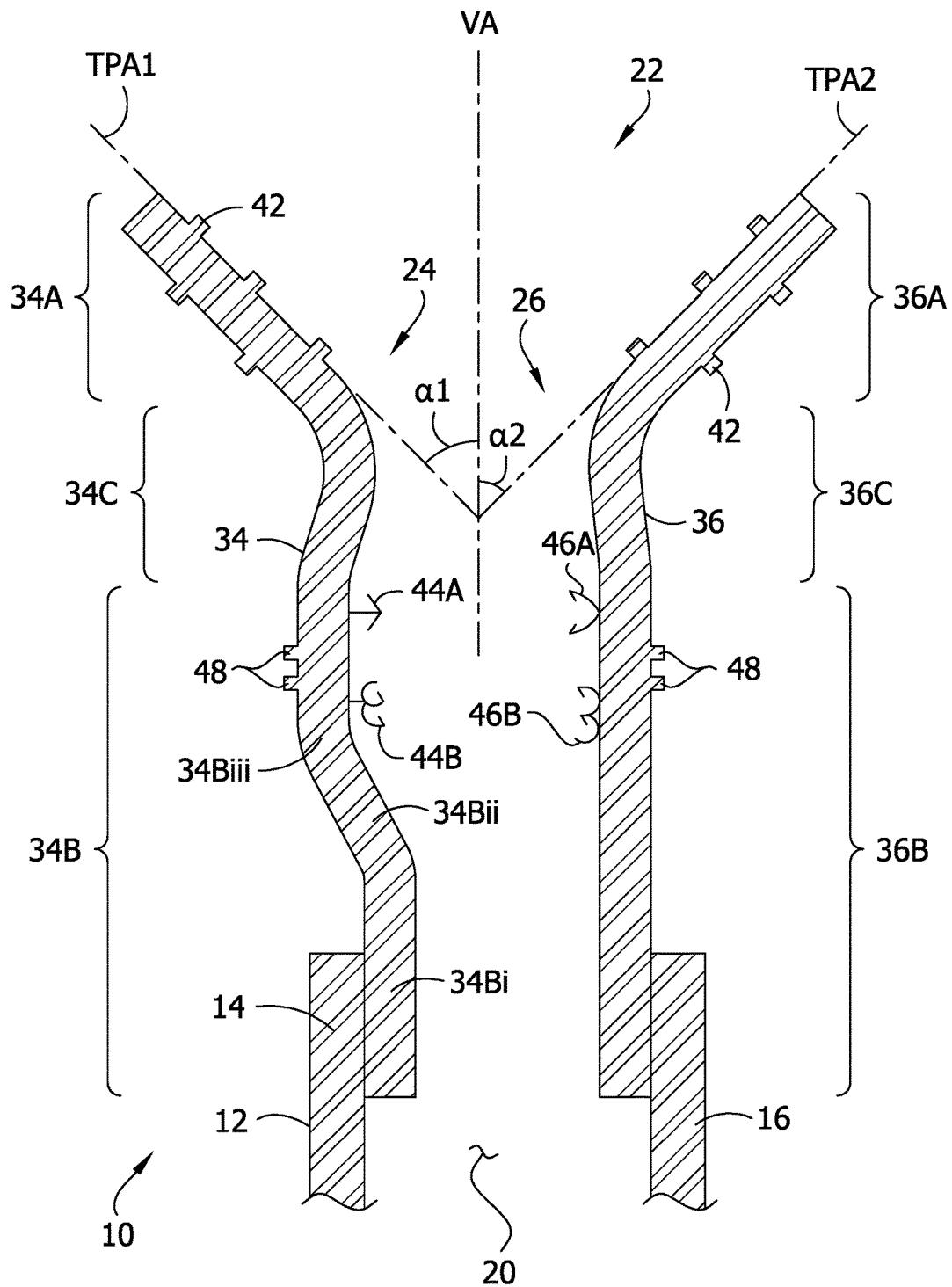
FIG. 2 is an enlarged, fragmentary vertical section of a top portion of the bag taken at about a lateral midpoint of the bag, illustrating a closure of the bag in an open configuration.
Figure 3:
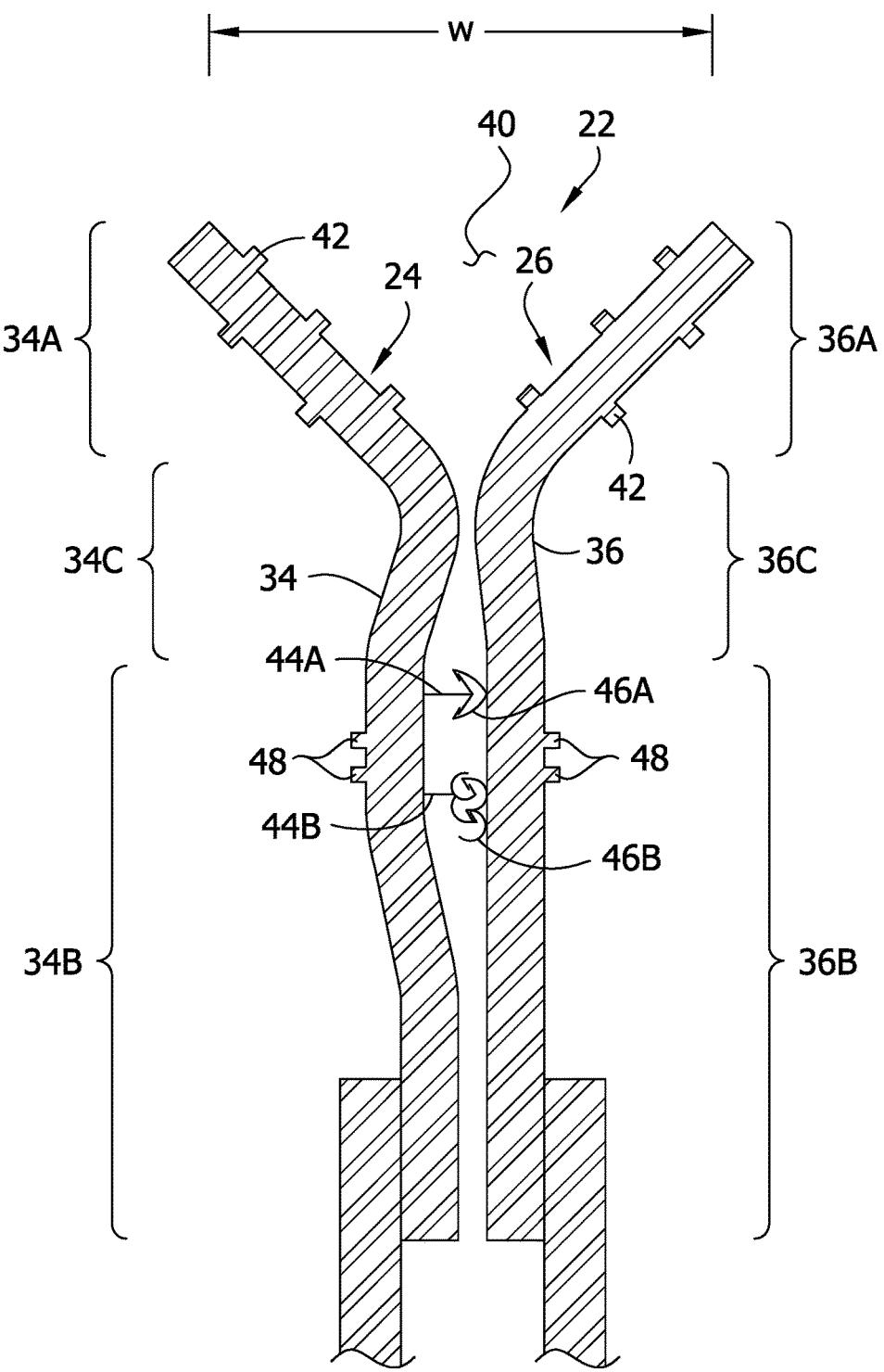
FIG. 3 is a fragmentary section similar to FIG. 2, illustrating the closure in a closed configuration.

Referring to FIGS. 1-3, one embodiment of a bag is generally indicated at reference number 10. As will be evident, the bag 10 includes features that make the bag easy to open. For example, upper margins of the bag 10 are laterally spaced apart from one another when the bag is closed to readily provide access for gripping when opening the bag.

The bag 10 includes a bag body 12 comprising front and rear panels 14, 16. As illustrated in the drawings, each of the panels has a top margin, a bottom margin, and opposite side margins adjacent a top edge, a bottom edge, and side edges, respectively (each of the margins is broadly an end margin). The panels 14, 16 are joined along their bottom margins and side margins to define a bag interior 20. In one embodiment, the panels 14, 16 are formed as a single sheet of material that is folded at the bottom of the bag body 12 along a linear fold, and the side margins are joined together along fusion lines. The panels can be formed and joined together in other ways without departing from the scope of the invention. For example, the panels can be formed as separate sheets and fused together along the bottom margin and side margins. Whether the panels 14, 16 are formed as one piece and folded over, or formed as two pieces, the end margins are considered to be joined together for purposes of this description. In some embodiments, the end margins are joined to form a fluid tight, liquid tight, and/or gas tight seal. In other embodiments, the end margins can be joined together without forming a seal.

The bag interior 20 is adapted to receive items placed within the bag 10. The top margins of the bag panels 14, 16 can be initially unsecured along their length to define an opening permitting access to the bag interior 20 and its contents. It will be understood that, though the top of the bag 10 defines the opening in the illustrated embodiment, in other embodiments, the sides or bottom of the bag can define the opening without departing from the scope of the invention. Preferably, corresponding end margins of joined panels can define an opening that can be opened and closed in accordance with the principles set forth below.

The bag 10 further includes a closure, generally indicated at 22. Referring to FIGS. 2 and 3, the closure 22 includes front and rear ("first and second") closure members, generally indicated at 24, 26. Each closure member 24, 26, is appended to the top margin of a respective bag panel 14, 16 for selectively opening and closing the bag 10. Each closure member 24, 26 extends across the width of the bag body 12, and the illustrated closure members are joined together at their side margins. In a preferred embodiment, each closure member 24, 26 is a one-piece body of polymeric material formed, for example, in a profile extrusion process as discussed in further detail below. But in certain embodiments, parts of the each closure member 24, 26 can be formed of different materials and/or as separate pieces joined together without departing from the scope of the invention. The closure members 24, 26 are transparent or translucent. In another embodiment (not shown), the closure members can be opaque. Preferably the closure members 24, 26 are appended to the bag panels 14, 16 after the bag body 12 is formed. But the closure members and bag body could also be formed together as one piece in, for example, an extrusion process without departing from the scope of the invention.

As shown in FIGS. 2 and 3, each closure member 24, 26 includes a support wall 34, 36 that is attached (e.g., adhered, fused, etc.) to a respective one of the bag panels 14, 16 to secure the closure member to the bag body 12. Each support wall 34, 36 has a height extending from a bottom end margin to a top end margin thereof. Each support wall 34, 36 also has a width extending the width of the bag body 12, from a first side of the support wall to an opposite second side. In the illustrated embodiment, a bottom margin of each support wall 34, 36 overlies a top margin of the respective bag panel 14, 16. But the top margin of the bag panels can, in other embodiments, extend above the top margins of the support walls. It will be understood that the support walls 34, 36 may be attached to the inside surface (as shown) or the outside surface of the bag panels 14, 16.

Each support wall 34, 36 is resilient and has a self-retaining form in vertical section that extends widthwise of the support wall. Throughout this description, the term "vertical section" is used to refer to a section taken in a plane oriented generally orthogonal to the width of a closure member (e.g., a plane orthogonal to the machine direction of the closure member). As explained below, the self-retaining form of the support walls 34, 36 facilitates gripping the support walls when the closure 22 is closed as shown in FIG. 3. As used herein, the "self-retaining form in vertical section" of a support wall refers to the cross-sectional shape of the support wall at rest, when no external forces (e.g., forces of interlocking engagement between mating closure members, a separation force, etc.) are imparted on the closure member. A support wall has its "self-retaining form in vertical section" when it is detached from the bag body and the mating closure member and is not deformed by other forces acting on the closure member. In some embodiments, joining a closure member to a bag body may cause a support wall to deform from its self-retaining form in vertical section. But in the illustrated embodiment, the interior segment along the width of each of the support walls 34, 36 generally maintains its self-retaining form in vertical section when it is attached to the respective bag panel 14, 16. Thus, the self-retaining form in vertical section of each of the support walls 34, 36 is shown in FIG. 2.

Each support wall includes a top portion 34A, 36A adjacent to the top end of the closure member 24, 26, a bottom portion 34B, 36B adjacent the bottom end of the closure member, and an outwardly curved middle portion 34C, 36C extending between the top portion and the bottom portion. As explained below, the self-retaining form in vertical section of each of the support walls 34, 36 is configured so that the top portions 34A, 36A are spaced apart from one another when the closure 22 is closed (FIG. 3) to form gripping panels for opening the bag. Thus, the self-retaining form of the support walls 34, 36 in vertical section is shaped so that the top portions 34A, 36A of the support walls extend outwardly away from one another to create separation that allows a user to separately grasp the first and second closure members 24, 26 without difficulty.

In the illustrated embodiment, the self-retaining form of each of the top portions 34A, 36A of the support walls 34, 36 in vertical section is substantially straight. But as explained below, because the middle portions 34C, 36C of the support walls 34, 36 are outwardly curved, the top portions 34A, 36A are angled outward away with respect to a central vertical axis. The top portions 34A, 36A are shaped and arranged to define an effective included angle α therebetween, as shown in FIG. 2. In other words, when the first support wall 34 is arranged in its self-retaining form, the top portion 34A extends in vertical section generally along a first top profile axis TPA1; when the second support wall 36 is arranged in its self-retaining form, the top portion 36A extends in vertical section generally along a second top profile axis TPA2 oriented at the effective included angle α with respect to the first top profile axis TPA1. In the illustrated embodiment, the angles $\alpha_1$, $\alpha_2$ are defined between a vertical axis VA and the first and second top profile axes TPA1, TPA2, respectively. These angles are defined when the closure 22 is in the open position and the closure members 24, 26 are substantially vertically aligned. In the closed position, the forces that hold the closure members 24, 26 closed can cause deformation of one or both of the support walls 34, 36 from its self-retaining form so that the angle between the top portions of the support walls changes. In one or more embodiments, the angles $\alpha_1$, $\alpha_2$ are each in an inclusive range of from about 10° to about 70°. In general, the angle will be smaller if the ends of the support walls 34, 36 are joined together, and larger of the ends of the support walls are not joined together. As shown in FIG. 3 which illustrates a section taken at about the lateral midpoint of the bag 10, the angled top portions 34A, 36A are arranged in the closed position such that the tops of the support walls 34, 36 define a gap 40 therebetween. Since FIG. 3 illustrates the gap 40 at about the lateral midpoint of the bag, the width W of the gap in the drawing is a maximum width of the gap. In one or more embodiments, the top portions 34A, 36A of the support walls define a gap 140 having a maximum width W when the closure 22 is closed in an inclusive range of from about 0.2 cm to about 3.0 cm. In generally, the width will be smaller if the ends of the support walls 34, 36 are joined together and larger if the ends of the support walls are not joined together.

Each of the closure members 24, 26 comprises a plurality of gripping projections 42 that extend along the width of the bag 10 at spaced apart locations along the top portion 34A, 36A of the respective support wall 34, 36. In the illustrated embodiment, three gripping projections 42 protrude inwardly from the inboard surface of the respective support wall 34, 36 and two gripping projections protrude outwardly from the outboard surface of the respective support wall. The gripping projections enhance a user's grip on the top portions 34A, 36A of the support walls 34, 36 when manipulating the closure 22 in use. Other numbers and arrangements of gripping projections may be used in other embodiments. For example, in some embodiments, the support walls are free of gripping projections (e.g., the inboard and outboard surfaces of the top portions of the support walls are substantially smooth).

Figure 4:
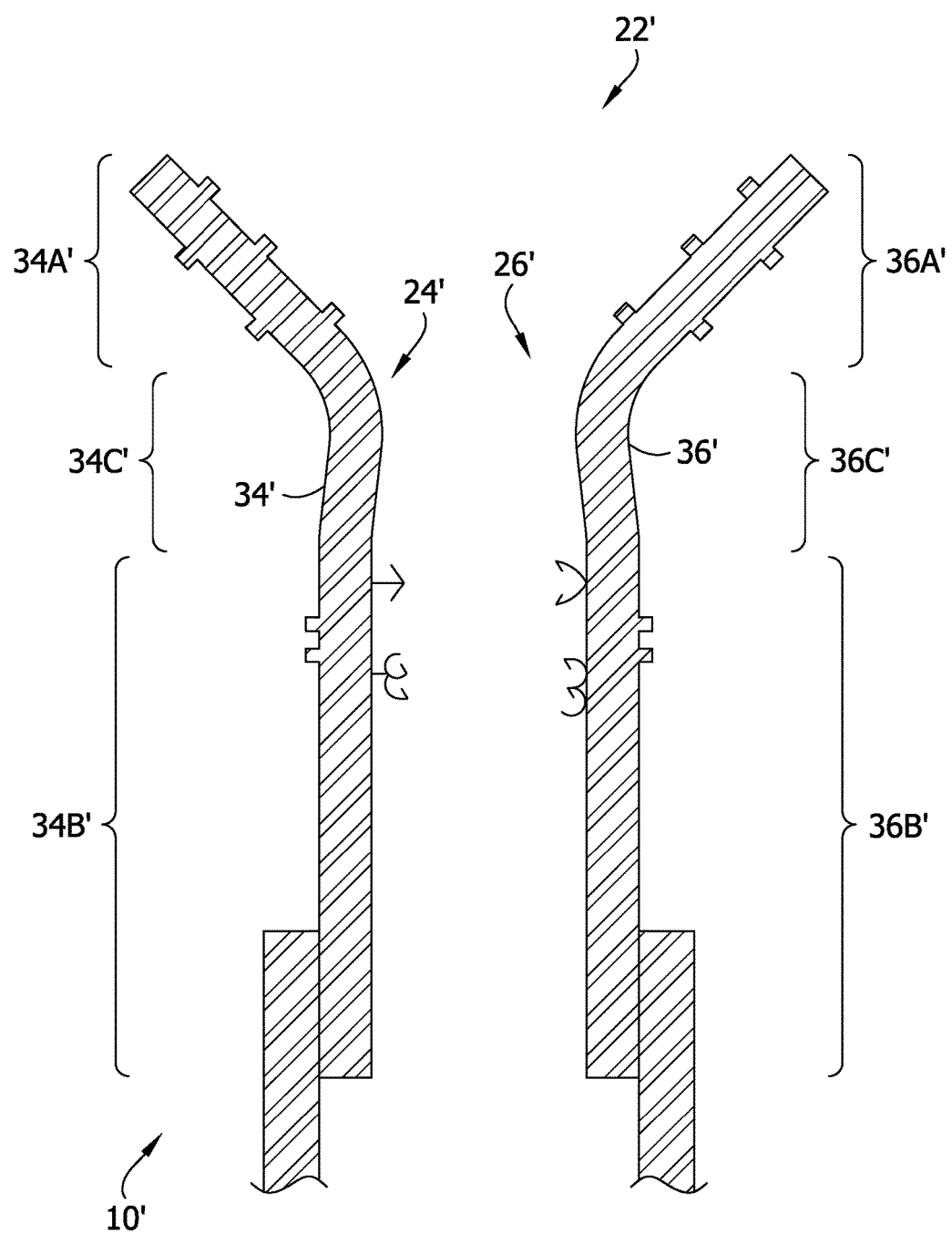
FIG. 4 is a fragmentary section similar to FIG. 2 of another embodiment of a bag, illustrating a closure of the bag in an open configuration.

Referring to FIG. 2, the bottom portion 34B, 36B of each of the first and second support walls 34, 36 has a different self-retaining form in vertical section. The bottom portion 34B of the first support wall 34 has a slightly serpentine form in vertical section, and the bottom portion 36B of the second support wall 36 has a substantially straight form in vertical section. A lower segment 34Bi of the bottom portion 34B of the first support wall 34 is joined to the top margin of the front bag panel 14. The lower segment 34Bi is generally straight or planar and extends upward generally along a vertical axis. An intermediate segment 34Bii curves outward as it extends upward from the lower segment 34Bi. Finally, an upper segment 34Biii is substantially straight or curves upward toward a vertical orientation as it extends away from the upper end of the intermediate segment 34Bii. The upper margin of the upper segment 34Biii may curve slightly inward with respect to a vertical axis in some embodiments. In contrast, the bottom portion 36B of the second support wall 36 is joined to the rear bag panel 16 and extends upward from bag body generally in a plane along a vertical axis along a substantial portion of its height. As shown in FIGS. 2 and 3 the top margin of the bottom portion 36B can curve slightly inward with respect to a vertical axis. The curved shape of the upper segment 34Biii can be useful to facilitate proper interlocking of the profile members 44B, 46B. The profile member 44B, as shown in FIG. 2 is attached at a point near the top of the profile. Without the curved shape of the upper segment 34Biii, the profile 44B might be oriented at a more angled position with respect to the profile member 46B. If the angle is to extreme, the profile members 44B, 46B may not properly interlock when they are pressed together. START HERE It will be appreciated that the cross-sectional profiles of the bottom portions of the support walls can vary from the shapes shown in FIGS. 2 and 3. For example, FIG. 4 illustrates another embodiment of a closure, generally indicated at 22'. The closure 22' is substantially similar to the closure 22. Corresponding parts are given corresponding reference numbers, followed by a prime symbol. The closure 22' includes first and second closure members 24', 26', each comprising a respective support wall 34', 36' having a respective top portion 34A', 36A', a respective bottom portion 34B', 36B', and a respective middle portion 34C', 36C'. Each of the closure members 24', 26' has a similar from in vertical section to a respective one of the closure members 24, 26 of FIGS. 2 and 3, except that the bottom portion 34B' of the first support wall 34' has a different form than the bottom portion 34B of the first support wall 34. Instead of being slightly serpentine, the profile of the bottom portion 34B' of the first support wall 34 is a mirror image of the profile of the bottom portion 36B' of the second support wall 36' (i.e., the bottom portion 34B' is substantially straight along its height and curves slightly inward adjacent the top margin thereof). Other embodiments may have support walls having still other self-retaining forms in vertical cross-section without departing from the scope of the invention.

Referring again to FIGS. 2 and 3, each of the closure members 24, 26 comprises first and second interlocking profiles 44A, 44B, 46A, 46B formed along the bottom portion 34B, 36B of the respective support wall 34, 36. Although the illustrated interlocking profiles 44A, 44B, 46A, 46B are formed along the bottom portions 34B, 36B, in other embodiments, the interlocking profiles may be formed along other portions of a support wall. The illustrated interlocking profiles 44A, 44B, 46A, 46B extend along the width of the respective support wall 34, 36 at a location spaced apart along the height of the respective support wall just beneath the outwardly curved middle segments 34C, 36C. Although the illustrated closure 22 includes two pairs of interlocking profiles 44A, 44B, 46A, 46B, it will be understood that other embodiments can include only one pair of interlocking profiles or more than two pairs of interlocking profiles without departing from the scope of the invention. A pair of gripping projections 48 extends outwardly from the outboard surface of each support wall 34, 36 at a location spaced apart between the respective first and second closure profiles 44A, 44B, 46A, 46B to provide additional structure for gripping the closure members 24, 26, for example to aid in interlocking the first and second closure profiles.

In the illustrated embodiment, the first pair of interlocking profiles 44A, 46A includes is symmetrical male connector extending inward from the support wall 34 and mating symmetrical female connecter extending inward from the opposite support wall 36. From the closed position shown in FIG. 3, the first pair of interlocking profiles 44A, 46A may be disengaged by application of a separation force upon the support walls 34, 36 at a location above the interlocking profiles or upon the support walls and/or bag panels 14, 16 at a location below the profiles. The separation force required to disengage the first pair of interlocking profiles 44A, 46A is about the same whether it is applied above or below the interlocking profiles.

The second pair of interlocking profiles 44B, 46B in the illustrated embodiment includes an asymmetrical first connector extending inward from the support wall 34 and an asymmetrical second connector extending inward from the opposite support wall 36. The asymmetrical connectors 44B, 46B are configured for mating engagement when the closure 22 is closed. As is known in the art, the connectors 44B, 46B are configured and arranged to require a substantially greater separation force to disengage the interlocking profiles when the separation force is imparted at a location below the interlocking profiles (i.e., on portions of the support walls 34, 36 located below the interlocking profiles and/or on the front and rear bag panels 14, 16) than when the separation force is imparted at a location above the interlocking profiles (i.e., on portions of the support walls 34, 36 located above the interlocking profiles). This feature is thought to function in cooperation with the self-retaining form of each of the support walls 34, 36 in vertical section to encourage opening the bag by application of a separation force on the top portions 34A, 36A of the support wall.

As shown in FIG. 3, the profile members 44A, 44B, 46A, 46B are configured for selective complementary engagement to close the closure 22 and thereby close the bag 10. In a preferred embodiment, the interlocking profiles 44A, 44B, 46A, 46B are configured to form a fluid tight, liquid tight, and/or gas tight seal when closed. In other embodiments, the interlocking profiles 44, 46 can be closed without forming a seal. It will be understood that other numbers and types of profile connectors may be used without departing from the scope of the invention.

As mentioned above, the middle portions 34C, 36C of the support walls 34, 36 curve outwardly away from one another as they extend upward toward the top portions 34A, 36A of the support walls. The curved middle portions 34C, 36C are shaped and arranged so that the generally straight top portions 34A, 36A extend outwardly away from one another as they extend upward from the middle portions to form gripping panels that are spaced apart from one another when the closure is closed. In one or more embodiments, the middle portions 34C, 36C of the support walls 34, 36 have a radius of curvature in an inclusive range of from about 1 cm to about 3 cm. It will be understood that the radius of curvature may vary along the height of the middle portion of the support wall.

As can be seen, the self-retaining form of the support walls 34, 36 in vertical section facilitates gripping the closure 22 to open the bag 10. Rather than relying on additional grip enhancing structures such as formations that urge the support walls outward only when closed or gripping panels formed as appendages to support walls, the enhanced gripping structure of the closure 22 is achieved by forming the closure members 24, 26 so that each of the support walls 34, 36 has a self-retaining form in vertical section that curves outwardly as it extends upwardly. In use, a user may insert one or more fingers into the gap 40 between the support walls 34, 36 when the closure 22 is closed and grasp the top portions 34A, 36A to pull them apart, thus disengaging the locking profiles 44A, 44B, 46A, 46B and separating the closure members 24, 26 to open the bag 10. Although each of the closure members 24, 26 has a support wall 34, 36 comprising an outwardly curved middle portion 34C, 36C in the illustrated embodiment, separation between the top portions of closure member support walls may also be provided when the middle portion of only one of the closure members is outwardly curved and the middle portion of the other closure member is substantially straight.

In certain embodiments the spacing of gripping panels may be augmented by a construction that urges the gripping panels to even more outwardly oriented angles when the closure is closed. For example, referring to FIGS. 5 and 6 another embodiment of a closure is generally indicated at reference number 122. The closure 122 is similar in many respects to the closure 22 of FIGS. 2 and 3. Features of the closure 122 are given the same reference number as corresponding features of the closure 22, plus 100. Like the closure 22, the closure 122 is joined to the top edge margin of a bag body 112 to form a bag generally indicated at 110. Moreover, like the closure 22, the closure 122 includes first and second closure members 124, 126, each comprising a respective support wall 134, 136 having a respective top portion 134A, 136A, a respective bottom portion 134B, 136B, and a respective middle portion 134C, 136C. As shown specifically in FIG. 5, each of the support walls 134, 136 is resilient and has substantially the same self-retaining form in vertical cross-section as the support walls 34, 36 of the closure 22, but the support walls may have different forms in vertical section in other embodiments.

Unlike the closure members 24, 26, each closure member 124, 126 includes an urging projection 154, 156 (broadly, an urging formation). The urging projections 154, 156 extend along the width of the respective support wall 134, 136 at a location spaced apart above the interlocking closure profiles 144A, 144B, 146A, 146B along the height of the support wall 134, 136. In the illustrated embodiment, the urging projections 154, 156 are located along the height of the support walls 134, 136 adjacent the outwardly curved middle portions 134C, 136C. The urging projections 154, 156 may also have other positions along the height of the support walls 134, 136 without departing from the scope of the invention. The urging projections 154, 156 are generally aligned with one another along the height of the closure 122.

Figure 5:
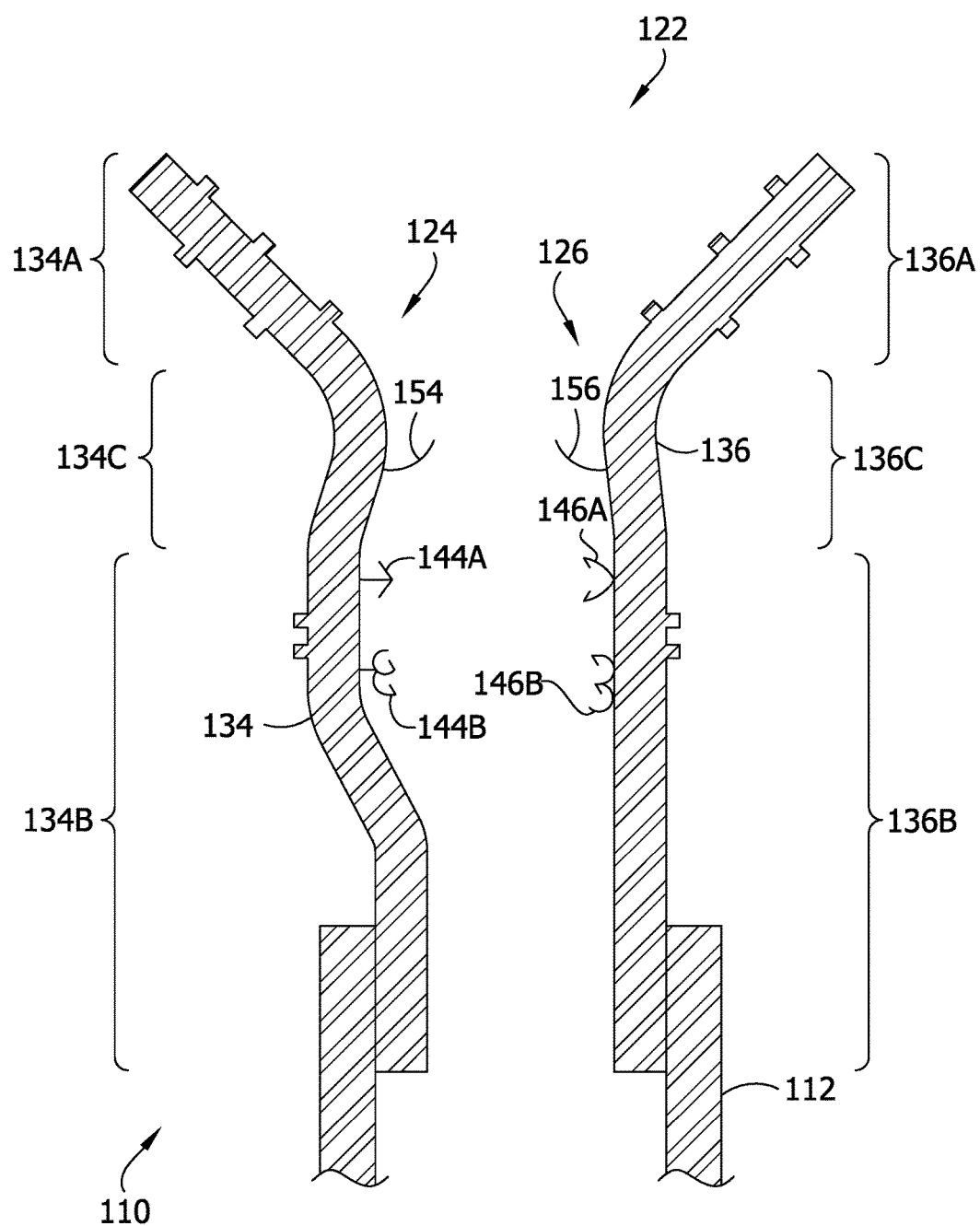
FIG. 5 is a fragmentary section similar to FIG. 2 of another embodiment of a bag, illustrating the closure of the bag in an open configuration.
Figure 6:
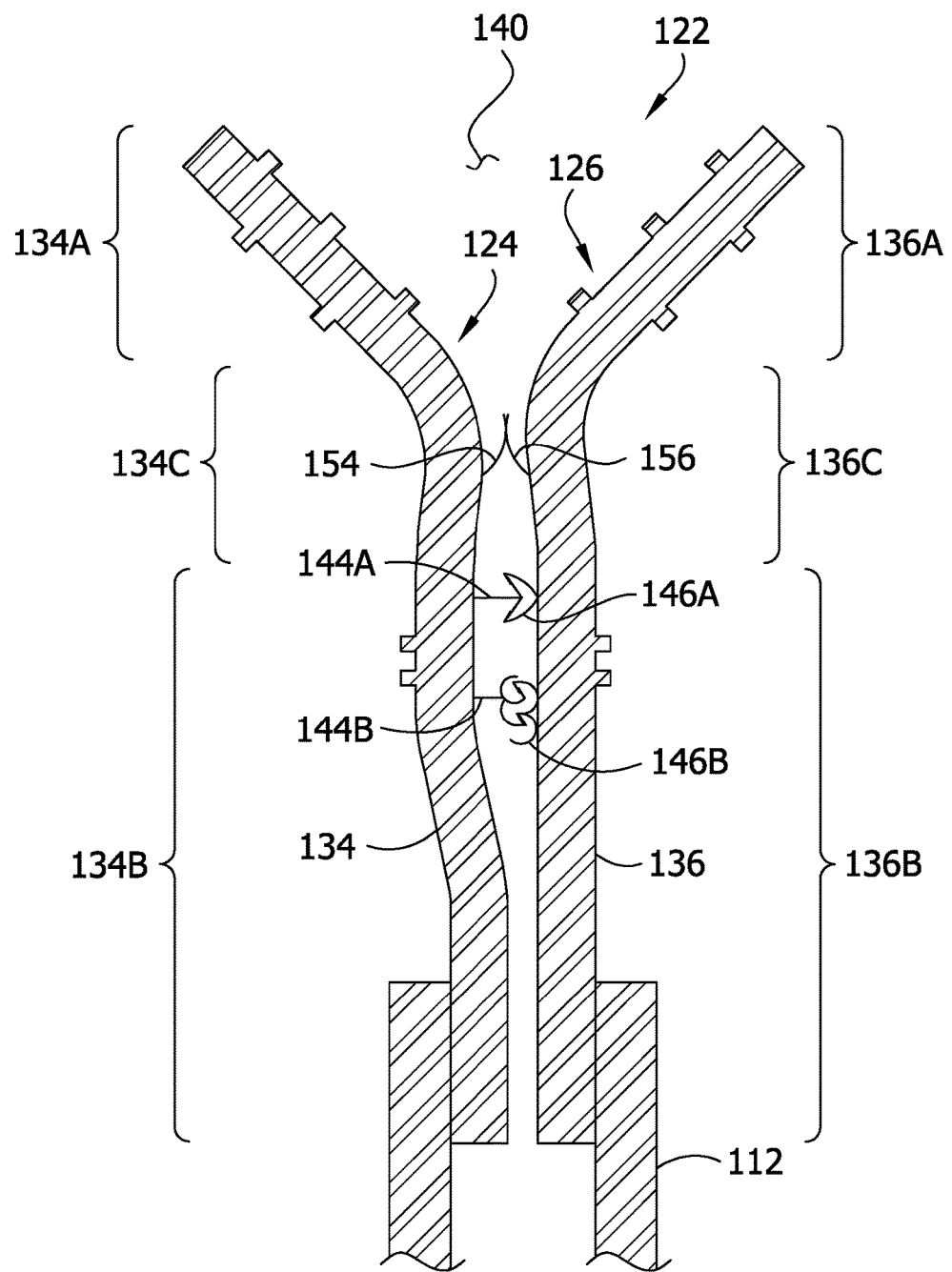
FIG. 6 is a fragmentary section similar to FIG. 5, illustrating the closure in a closed configuration.

The illustrated projections 154, 156 curve upwardly toward a free end as they project inwardly from the support walls 134, 136. In other embodiments, it is contemplated that one or both of the urging projections could have a different shape without departing from the scope of the invention. As shown in FIG. 5, each urging projection 154, 156 is resiliently biased toward a non-deformed position in which it extends inward from a respective joint with the support wall 134, 136. As shown in FIG. 6, when the closure 122 is closed, the urging projections 154, 156 engage one another. Preferably, the urging projections 154, 56 are sized and arranged for interfering engagement so that one or both of the projections is deformed away from its non-deformed position when the closure is closed. The engagement of the urging projections 154, 156 causes deformation from the non-deformed position (FIG. 5) to a deformed position (FIG. 6). For example, the engagement of the urging projections 154, 156 deflects the free ends outward closer to the respective support wall 134, 136 than in the non-deformed positions. Furthermore, when the closure 22 is closed, the engagement of the urging projections 154, 156 deflects the top portions 134A, 136A of the support walls 134, 136 outward relative to the self-retaining form of the top portions in vertical section. Thus, the urging projections 154, 156 engage one another when the closure 22 is closed to urge the top portions 134A, 136A of the support walls 134, 136 outward and enlarge the width of the gap 140 between the gripping panels.

Figure 7:
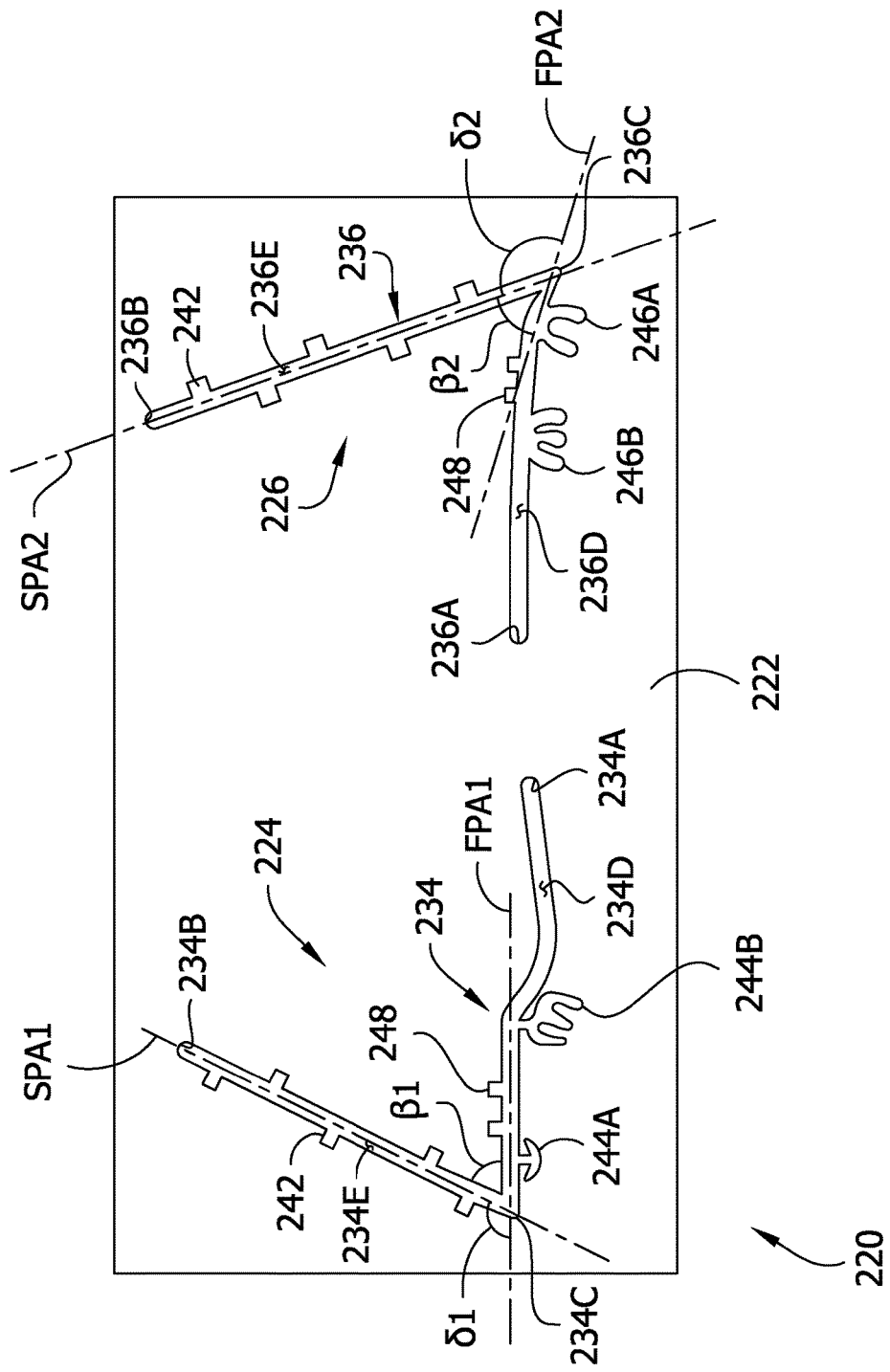
FIG. 7 is a plan view of a die head for forming a closure of the bag of FIGS. 1-3.

In certain embodiments, any of the closures discussed above may be formed to have the desired self-retaining form in vertical section using an extrusion process. Referring to FIG. 7, one embodiment of a die head that is suitable for forming the closure 22 of FIGS. 2 and 3 is generally indicated at reference number 220. The die head 220 includes a die head body 222 that is configured for being operatively received in an extruder (not shown). The die head body 222 defines a first closure member extrusion slot, generally indicated at 224, which is shaped and arranged for extruding the first closure profile 24. Likewise, the die head body 222 defines a second closure member extrusion slot, generally indicated at 226, which is shaped and arranged for extruding the second closure profile 26. As explained below, it is understood that the extrusion process can include additional processing steps that occur after the polymer stock is dispelled from the die head 220 by an extruder. While the illustrated embodiment includes a one-piece die head body 222 that defines both the first closure member extrusion slot 224 and the second closure member extrusion slot 226, it will be understood that in other embodiments the extrusion slots for the first and second closures 24, 26 may be formed in separate die head bodies.

Each of the first and second extrusion slots 224, 226 includes a support wall segment, generally indicated at 234, 236, respectively. The support wall segments 234, 236 are shaped and arranged for extruding the support walls 34, 36 of the closure members 24, 26. Thus, the support wall segments 234, 236 are shaped and arranged to extrude support walls 34, 36 having outwardly curved middle portions 34C, 36C and top portions 34A, 36A that the extend outwardly apart from one another to define gripping panels. In addition to the support wall segments 234, 236, each of the illustrated extrusion slots 224, 226 includes first and second interlocking profile segments 244A, 244B, 246A, 246B for extruding the interlocking profiles 44A, 44B, 46A, 46B of the closure members 24, 26, as well as grip projection segments 242, 248 for extruding the grip projections 42, 48 of the closure members. As shown in FIG. 7, the interlocking profile segments 244A, 244B, 246A, 246B and the grip projection segments 242, 248 are fluidly coupled to the respective support wall segments 234, 236 to from interlocking profiles 44A, 44B, 46A, 46B and grip projections 42, 48 that are integrally formed (broadly, joined) with the respective support walls 34, 36.

Each support wall segment 234, 236 has a first end 234A, 236A, an opposite second end 234B, 236B, and a vertex 234C, 236C spaced apart between the first end and the second end. A first portion 234D, 236D of each support wall segment 234, 236 extends between the vertex 234C, 236C and the first end 234A, 236A, and a second portion 234E, 236E of each support wall segment extends between the vertex 234C, 236C and the second end 234B, 236B. The section portion 234E of the support wall segment 234 extends from the vertex 234C back over the first portion 234D of the support wall segment. Similarly, the second portion 236E of the support wall segment 236 extends from the vertex 236C back over the first portion 236D of the support wall segment. This configuration has been found to be beneficial in producing support walls 24, 26 that have angles $α_1$, $α_2$ in the range of 10° to 70° as mounted on the bag 12 as shown in FIG. 2. In the illustrated embodiment, the first portion 234D of the first wall segment 234 has a serpentine shape and the first portion 236D of the of the second wall segment 236 has a substantially straight shape with a short curved section adjacent the inner end thereof. The first portion 234D, 236D of each support wall segment 234, 236 includes an inner section extending outward from the respective vertex 234C, 236C generally along a respective first portion axis FPA1, FPA2. It is understood that where, as in the case of the first portion 236D of the support wall segment 236, the inner section of a portion of a support wall segment is curved, the respective portion axis extends along a line tangent to the curve at the intersection between the first and second portions of the support wall segments (e.g., at a vertex). Likewise, as in the case of the first portion 234D of the support wall segment 234, where the inner section of a portion of a support wall segment is straight, the respective portion axis extends along the respective inner portion of the support wall segment. In the illustrated embodiment, the entire second portion 234E, 236E extends outward from the respective vertex 234C, 236C along a second portion axis SPA1, SPA2. However, it will be understood that the second portion could be curved such that only an inner section of the second portion may extend generally along the second portion axis without departing from the scope of the invention.

As shown in FIG. 7, the first portion axis FPA1, FPA2 of each closure member slot 224, 226 is oriented transverse to the second portion axis SPA1, SPA2 of the slot. The first portion axis FPA1, FPA2 of each slot 224, 226 intersects the second portion axis SPA2, SPA2 at the vertex 234C, 236C of the respective support wall segment 234, 236. The first portion axis FPA1, FPA2 extending along the portion of the wall segment portion 234D, 236D nearest to and intersecting the vertex 234C, 236C. In the illustrated embodiment, each pair of first and second portion axes FPA1, FPA2, SPA1, SPA2 is oriented such that the inner sections of the first wall segment portions 234D, 236D and the second wall segment portions 234E, 236E define included angles $β_1$, $β_2$ therebetween. In other words, the angles $β_1$, $β_2$ are the angles of intersection between the inner sections of the first wall segment portions 234D, 236D and the second wall segment portions 234E, 236E of the respective slot 224, 226. In certain embodiments, the included angle $β_1$, $β_2$ is in an inclusive range of from about 10° to about 135°, such as an inclusive range of from about 20° to about 105°, for example an inclusive range of from about 30° to about 90°.

It is understood that each included angle $β_1$, $β_2$ is 180° minus a respective offset angle $σ_1$, $σ_2$, which is a measurement of how far offset the second wall segment portion 234E, 236E is from an imaginary wall segment portion that extends away from the first wall segment portion 234D, 236D along the respective first portion axis FPA1, FPA2. As will be understood from the disclosure below, if such an imaginary wall segment portion were used in place of the second wall segment portion 234E, 236E, the support walls of the closure members formed by extrusion through the die head 220 would lack the outwardly curved middle portions 34C, 36C of the closure members 24, 26. The offset measured by the offset angle $σ_1$, $σ_2$ is related to the curvature of the outwardly curved middle portions 34C, 36C of the support walls 34, 36 of the closure members 24, 26 formed by the die head 220. All else being equal, a larger offset angle $σ_1$, $σ_2$ corresponds with a smaller radius of curvature of the curved middle portions and a smaller offset angle corresponds with a larger radius of curvature over the same height of the support wall 34, 36.

Each second wall segment portion 234E, 236E extends away from the respective first portion axis FPA1, FPA2 in the direction opposite from the respective interlocking member segments 244A, 244B, 246A, 246B. Thus when the polymer is dispelled from the extrusion slots 224, 226, the portions of the polymer that pass through the second wall segment portions 234E, 236E extend in section away from the first wall segment portions 234D, 236D in the opposite direction from the interlocking member segments 244A, 244B, 246A, 246B. Moreover, the second wall segment portions 234E, 236E extend in section away from inner sections of the first wall segment portions 234D, 236D at the offset angle $σ_1$, $σ_2$ relative to the first portion axes FPA1, FPA2. After the extrudate is processed and cured as described in further detail below, the portions of the extrudate that passed through the inner sections of the first and second wall segment portions 234D, 236D, 234E, 236E form the curved middle portions 34C, 36C of the support walls 34, 36.

Figure 8:
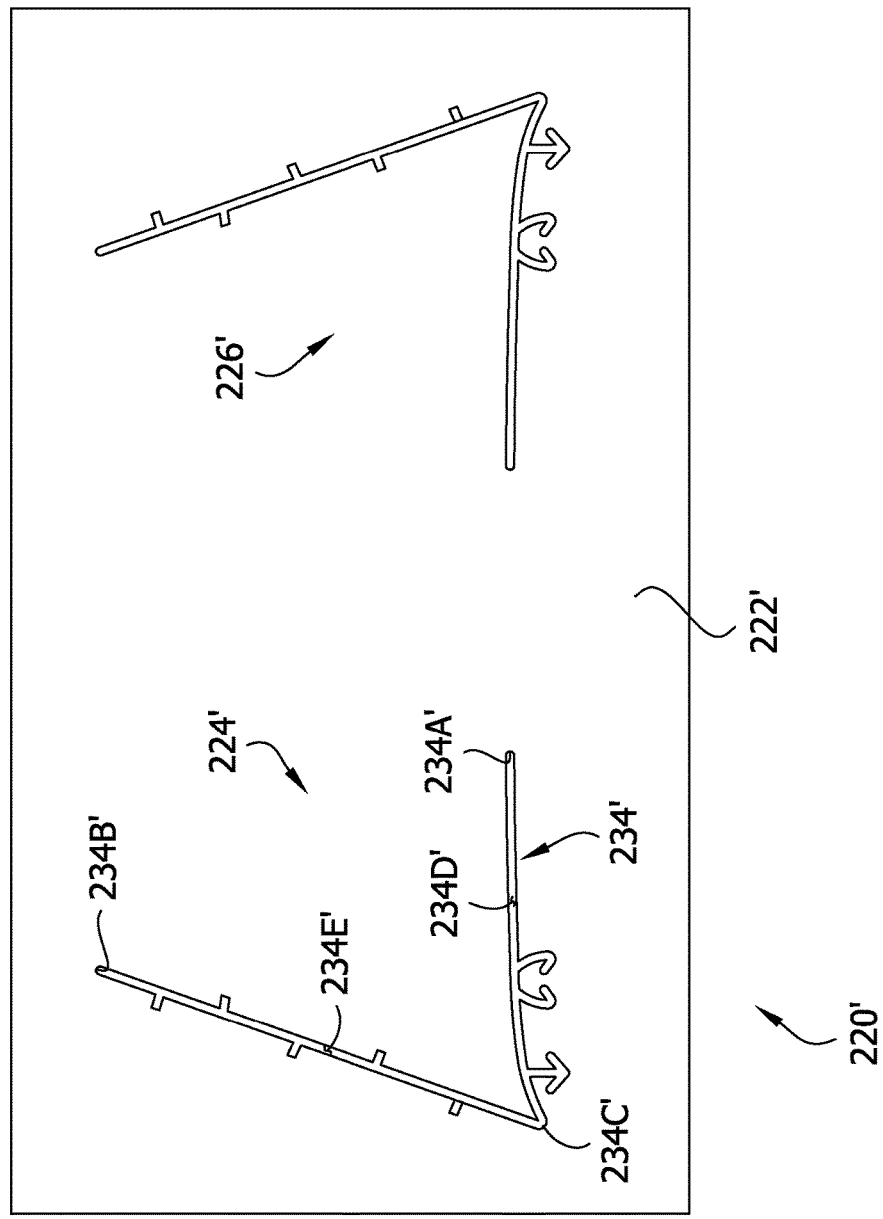
FIG. 8 is a plan view of a die head for forming a closure of the bag of FIG. 4.

It will be understood that various alternative configurations of a die head may be used without departing from the scope of the invention. For example, as shown in FIG. 8, to form the closure members 24', 26', a different die head 220' is used that comprises a die head body 222' defining a first extrusion slot 224' that is different than the first extrusion slot 224 and a second extrusion slot 226' that is substantially identical to the second extrusion slot 226. Like the first extrusion slot 224, the first extrusion slot 224' has a wall segment 234' comprising a first end 234A', a second end 2346', a vertex 234C', a first portion 234D' extending between the vertex and the first end, and a second portion 234E' extending between the vertex and the second end. Unlike the first end portion 234D of the first extrusion slot 224, the first end portion 234D' of the first extrusion slot 224' is substantially straight, comprising only a short curved section adjacent the inner end thereof.

Referring to FIG. 9, in another embodiment, a die head 320 is configured to form the first and second closure members 124, 126 of FIGS. 5 and 6. Like the die head 220, the die head 320 includes a die head body 322 defining first and second extrusion slots 324, 326. Like the first and second extrusion slots 234, 236, the extrusion slots 324, 326 include wall segments 334, 336. Each wall segment 334, 336 comprises a first end 334A, 336A; a second end 3346, 3366; a vertex 334C, 336C; a first portion 334D, 336D extending between the vertex and the first end; and a second portion 334E, 336E extending between the vertex and the second end. Unlike the first and second extrusion slots 224, 226, the first and second extrusion slots 324, 326 further comprise first and second urging projection segments 354, 356, respectively. Each of the first and second urging projection segments 354, 356 is fluidly connected to the respective support wall segment 334, 336 adjacent the vertex 334C, 336C thereof. It will be understood that the first and second urging projection segments may have other locations (e.g., spaced apart from the respective vertexes) in other embodiments. The urging projection segments 354, 356 of the first and second extrusion slots 324, 326 are shaped and arranged to extrude the urging projections 154, 156 of the closure members 124, 126 illustrated in FIGS. 5 and 6.

A suitable method of using the die head 220 to form the closure members 24, 26 will now be briefly described. It is understood that, by substituting either of the die heads 220', 320 for the die head 220, the same method could also be used to form the closure members 24', 26' or the closure members 124, 126. Initially, polymer is extruded through the extrusion slots 224, 226 in the die head 220. During this step, the polymer received in each of the extrusion slots 224, 226 has a form in section that generally corresponds to the shape of the respective extrusion slot. For example, the polymer has a support wall portion that has a form in section including a first inner segment and a second inner segment oriented transverse to the first inner segment (e.g., at an included angle β with respect to the first inner segment) and intersecting the first inner segment at a vertex. Shortly after the polymer is extruded through the die head 220 (e.g., before the polymer is fully cured and set), it is quenched, for example by being submerged in a cool water bath. Quenching the closure members 24, 26 cures and sets the polymer to have the self-retaining form in vertical section described above. More specifically, quenching fixes the inner cross-sectional segments of the polymer that previously passed through the extrusion slots 224, 226 adjacent the vertexes 234C, 236C to form the outwardly curved middle portions 34C, 36C of the support walls and thereby shape the support walls 34, 36 so that the top portions 34A, 36A define gripping panels that extend outwardly apart from one another when the closure 22 is closed. After quenching, additional post processing steps such as stretching the polymer through a sequence of rollers, annealing, etc., may also be performed as is known in the art.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatuses, systems, and methods without departing from the scope of the invention, it is intended that all matter contained in the above description and shown in the accompanying drawings shall be interpreted as illustrative and not in a limiting sense.

What is claimed is:

1. A closure for selectively closing a bag that is configured to facilitate opening of the bag when the bag is closed by the closure, the closure comprising:
   first and second closure members configured for mounting on the bag in opposed relation for releasably closing the bag, each closure member comprising:
      a support wall having a top end and a bottom end spaced apart along a height and a first side and a second side spaced apart along a width; and
      an interlocking profile extending along the width of the respective support wall at a location spaced apart from the top end of the support wall, the interlocking profile being configured for selective complementary interlocking engagement with the interlocking profile of the other closure member to close the closure;
      each support wall being resilient and having a self-retaining form in vertical section, the form extending continuously along a majority of the width of the support wall and including a top portion adjacent the top end, a bottom portion adjacent the bottom end, and a curved middle portion between the top portion and the bottom portion,
   wherein when the first and second closure members are mounted on the bag, the middle portions of the support walls curve outwardly away from one another as they extend upward toward the top portions of the support walls and the top portions of the support walls extend outwardly away from one another as they extend upward from the middle portions to form gripping panels that are spaced apart from one another by a gap that extends continuously along the majority of the width of at least one of the support walls when the closure is closed; and
   wherein the bottom portion of the support wall of the first closure member has a resilient and self-retaining serpentine cross-sectional profile.

2. A closure as set forth in claim 1 wherein the top portions of the support walls are each shaped and arranged to define an angle between the support wall and a vertical axis in an inclusive range of from about 10° to about 70°.

3. A closure as set forth in claim 1 wherein the middle portions of the support walls each have a radius of curvature in an inclusive range of from about 1 cm to about 3 cm.

4. A closure as set forth in claim 1 wherein the cross-sectional profile of the top portion of each of the support walls is substantially straight.

5. A closure as set forth in claim 1 wherein the tops of the support walls define a gap therebetween when the closure is closed, said gap having a maximum width in an inclusive range of from about 0.2 cm to about 3.0 cm.

6. A closure as set forth in claim 1 wherein the bottom portion of the support wall of the first closure member has at least one segment extending outward as it extends upward.

7. A closure as set forth in claim 1 wherein each of the first and second closure members comprises an urging projection extending inward from the middle portion of the respective support wall along the width of the support wall.

8. A closure as set forth in claim 7 wherein the urging projections are shaped and arranged for interfering engagement with each other when the closure is closed.

9. A closure as set forth in claim 7 wherein the urging projections engage one another when the closure is closed and thereby urge the top portions of the support walls outward away from each other.

10. A closure as set forth in claim 1 wherein the interlocking profiles of the first and second closure members are configured to require a substantially greater separation force to disengage the interlocking profiles when the separation force is imparted on the bottom portions of the support walls than when the separation force is imparted on the top portions of the support walls.

11. A closure member as set forth in claim 1 wherein each of the first and second closure members further comprises a plurality of gripping projections extending along the width of the support wall at spaced apart locations along the top portion of the respective support wall.

12. A bag comprising a bag body and a closure as set forth in claim 1 joined to a top edge margin of the bag body.

\* \* \* \* \*